(No Model.)

J. J. & T. J. McTIGHE.
ARMATURE FOR DYNAMO ELECTRIC MACHINES.

No. 260,110.　　　　　　　　Patented June 27, 1882.

Witnesses:-
Thomas J. Patterson
William Billings

James J. McTighe
Thomas J. McTighe } Inventors.

Connolly Bros & McTighe
Attorneys.

UNITED STATES PATENT OFFICE.

JAMES J. McTIGHE AND THOMAS J. McTIGHE, OF PITTSBURG, PA.

ARMATURE FOR DYNAMO-ELECTRIC MACHINES.

SPECIFICATION forming part of Letters Patent No. 260,110, dated June 27, 1882.

Application filed March 28, 1882. (No model.)

*To all whom it may concern:*

Be it known that we, JAMES J. MCTIGHE and THOMAS J. MCTIGHE, of Pittsburg, in the county of Allegheny and State of Pennsylvania, have invented certain new and useful Improvements in Armatures for Magneto and Dynamo Electric Machines and Electric Motors; and we do hereby declare that the following is a full, clear, and exact description of the invention, which will enable others skilled in the art to which it appertains to make and use the same, reference being had to the accompanying drawings, which form a part of this specification, in which—

Figure 1:
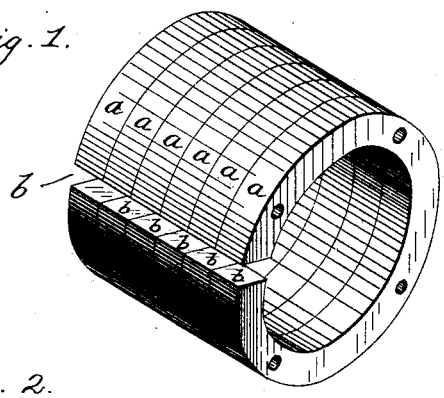
Figure 2:
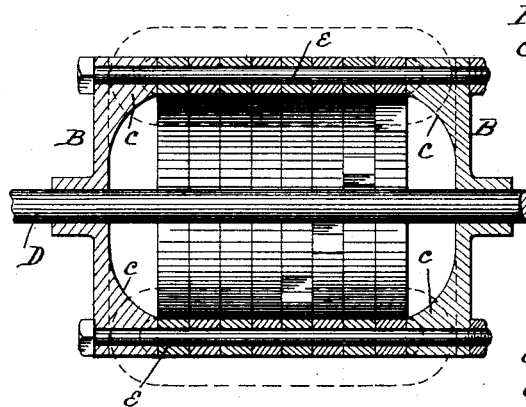
Figure 4:
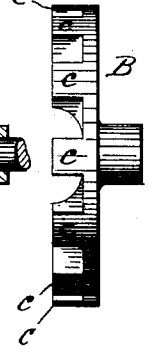
Figure 3:
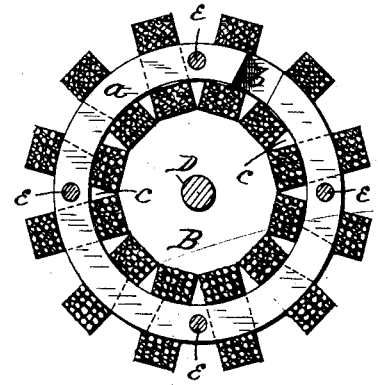
Figure 5:
Figure 6:
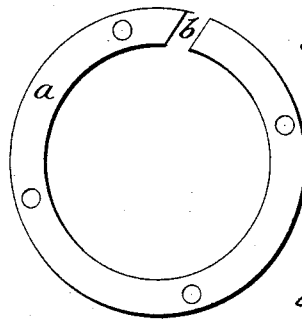
Figure 7:
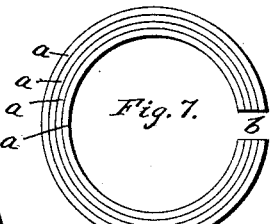
Figure 8:
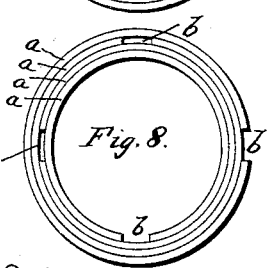

Figure 1 is a perspective showing the armature-core in position to receive the coils. Fig. 2 is a longitudinal vertical section of the complete armature, the coils being indicated by dotted lines. Fig. 3 is a transverse section of Fig. 2, taken between two of the rings. Fig. 4 is a side elevation of one of the heads. Fig. 5 is a section of modified ring. Fig. 6 is another modification. Figs. 7 and 8 show another modification in its preparatory and final positions.

The object of our invention is to secure a novel mode of construction for the armatures of magneto and dynamo electric machines and electric motors.

The invention relates to the so-called "ring-armatures," which are usually wound with wire over the inner and outer surfaces of the ring or core. We aim at a construction which will permit of the separate winding of the coils on suitable forms, and then placing them on the ring, and placing them in such manner that there will be no weak spot in the ring or core to yield to great centrifugal force, no possibility of the coils slipping on their core or the core slipping on the shaft; and to effect all this, while producing a well-balanced body, which is a matter of great importance in these armatures, our invention consists in the construction of parts and their combinations, as hereinafter fully described and claimed.

In the drawings, Fig. 1 shows our armature-core ready to receive the coils, which have been wound separately to a standard, so as to be as nearly as possible of equal weights. This armature is composed of a number of metallic rings, $a$, preferably of soft iron, each ring having an excision or slit, $b$, wide enough to admit a coil. The rings are placed together, with all the slits $b$ registering in a straight line, and the coils are inserted thereat and slipped upon the core till all are on. Then the rings are respectively worked around till the slits $b$ are all out of line. As each slit makes its ring light on that side, by working the rings till the slits form a spiral arrangement around the circle the armature will be in perfect balance. When the slits are thus out of a common line the coils are securely locked on the armature.

To secure the coils in position circumferentially we construct heads B of diamagnetic material, having the V-shaped projections $c$ on the inner face spaced equally apart and corresponding in number with that of the coils. These are set to the ends of the armature, so that the projections $c$ will enter between the ends of the coils and meet the metal core-rings $a$, and are bound together by the bolts $e$, passing through the rings $a$ and heads B, as shown. The ends of the coils thus occupy each its own seat between the projections $c$, and are not only secured against slipping, but are protected against any injury by abrasion or cutting. The position of the coils is shown by the dotted lines in Fig. 2 and by the section, Fig. 3. The heads B are then secured to the shaft D by set-screws or keys. Thus constructed the armature is very strong and well balanced and easily taken apart.

A single coil may be removed and replaced by simply removing the heads and bolts, working the core-segments around to form a slit at the coil to be removed, when the latter will at once be free. After replacing the coil the parts can be restored to their proper positions in a few moments and made as secure as ever.

The core-segments can be readily insulated electrically, if desired, by interposing suitable sheets of non-conductor between the rings and the heads, covering the bolts with hard-rubber or fiber tubes, and insulating the bolt-heads and nuts from the heads B by interposed non-conducting washers.

Where the ring-segments $a$ are made of sheet or plate metal they may be stamped readily and the bolt-holes and slits punched out.

Where the core-body is to be composed of a large number of thin segments, $a$, we prefer to construct the segments $a$ of the form shown at Fig. 5, where the ring is V-shaped in cross-section. This facilitates the working around of the parts in putting together or dismounting, as the rings nest together and guide each other.

The slit $b$ may be diagonal, as in Fig. 6.

Figs. 7 and 8 illustrate a modification wherein the segments $a$ are slitted, but as wide as the length of the core-body, the segments being successively smaller in diameter till the required thickness is made up. These can all be brought around, as in Fig. 7, the coils inserted, and then by working the segments $a$ the locked position of Fig. 8 is attained. This modification would require the bolts which connect the heads to pass along outside the outer segment, instead of going through, as in Fig. 2.

We claim as our invention—

1. In an annular armature, a core composed of a number of slitted rings, each capable of independent adjustment around its axis, substantially as described.

2. In an annular armature, a core composed of a number of slitted rings of soft iron, each capable of independent adjustment around its axis, substantially as described.

3. In an annular armature, a core composed of a number of incomplete rings, each having a single dividing-excision and being capable of independent adjustment around its axis, in combination with longitudinally-arranged rods or bars capable of locking said rings against movement around their axes, substantially as described.

4. An annular armature composed of a number of slitted rings circumferentially adjustable, a series of coils placed on said rings, and two or more longitudinal bars or rods binding said rings together, substantially as described, whereby the slits may be brought in line, the coils inserted, the rings adjusted circumferentially to throw the slits out of line, and then the rings locked in such position by the said bars or rods.

5. In an annular armature, a core composed of a number of incomplete rings, each having a single slit and circumferentially adjustable on its axis, in combination with diamagnetic heads and longitudinal rods or bars connecting said heads and rings together, substantially as described.

6. In an annular armature, a core composed of a number of incomplete rings, each having a single slit and circumferentially adjustable on its axis, in combination with longitudinal rods or bolts and heads having inward projections abutting against the rings and constituting spacing-blocks for the coils, substantially as described.

In testimony that we claim the foregoing as our own we have hereto affixed our signatures in presence of two witnesses.

JAMES J. McTIGHE.
THOMAS J. McTIGHE.

Witnesses:
THOMAS J. PATTERSON,
THOMAS S. O'CONNOR.